United States Patent
Theisen et al.

(10) Patent No.: US 9,245,464 B2
(45) Date of Patent: Jan. 26, 2016

(54) HOOK-TYPE DISPLAY MODULE

(71) Applicant: Target Brands, Inc., Minneapolis, MN (US)

(72) Inventors: Jennifer A. Theisen, Crystal, MN (US); Erin L. Zobel, Minneapolis, MN (US); William Y. Stafford, Minnetrista, MN (US)

(73) Assignee: Target Brands, Inc., Minneapolis, MN (US)

( * ) Notice: Subject to any disclaimer, the term of this patent is extended or adjusted under 35 U.S.C. 154(b) by 164 days.

(21) Appl. No.: 14/163,667

(22) Filed: Jan. 24, 2014

(65) Prior Publication Data

US 2015/0216062 A1     Jul. 30, 2015

(51) Int. Cl.
*G09F 19/00* (2006.01)
*G02F 1/1335* (2006.01)
*G09F 3/20* (2006.01)

(52) U.S. Cl.
CPC .............. *G09F 19/00* (2013.01); *G02F 1/1335* (2013.01); *G09F 3/202* (2013.01); *G09F 3/204* (2013.01); *Y10T 29/49117* (2015.01); *Y10T 29/49826* (2015.01); *Y10T 29/49947* (2015.01)

(58) Field of Classification Search
CPC ......... A47F 11/10; G09F 19/00; G09F 3/202; G09F 3/204; G02F 1/1335
See application file for complete search history.

(56) References Cited

U.S. PATENT DOCUMENTS

| | | |
|---|---|---|
| 1,978,636 A | 10/1934 | Keil |
| D197,236 S | 12/1963 | Brown |
| 4,164,009 A | 8/1979 | Maguire, Jr. et al. |
| 4,429,796 A | 2/1984 | Sussman |
| 4,531,313 A * | 7/1985 | Fast ................................. 40/657 |
| D285,268 S | 8/1986 | Scheid et al. |
| 4,747,025 A | 5/1988 | Barton |
| 4,762,235 A | 8/1988 | Howard et al. |
| 4,925,038 A | 5/1990 | Gajewski |
| 4,994,943 A | 2/1991 | Aspenwall |
| 5,011,018 A | 4/1991 | Keffeler |
| 5,012,936 A | 5/1991 | Crum |
| 5,085,154 A | 2/1992 | Merl |
| 5,088,607 A | 2/1992 | Risafi et al. |
| 5,265,735 A | 11/1993 | Hassel et al. |
| 5,330,063 A | 7/1994 | Remmers |
| 5,390,802 A | 2/1995 | Pappagallo et al. |

(Continued)

OTHER PUBLICATIONS

Pending U.S. Appl. No. 13/786,924, filed Mar. 6, 2013, entitled Shelf-Type Display Module, 32 pages.

(Continued)

*Primary Examiner* — Mary Ellen Bowman
(74) *Attorney, Agent, or Firm* — Leanne Taveggia Farrell; Westman Champlin & Koehler, P.A.

(57) ABSTRACT

A hook-type display module includes a base assembly, a display hook receiving plate and at least one display hook. The base assembly includes a pair of spaced-apart side frame members having distal ends and proximal ends and a front frame member connecting the distal ends of the side frame members. The display hook receiving plate is positioned so as to extend between the spaced-apart side frame members and is located proximate to the proximal ends of the spaced-apart side frame members. The at least one display hook includes a base coupled to the display hook receiving plate and a hook extending from the base to a distal end. The distal end of the hook terminates at a location between the display hook receiving plate and the front frame member.

20 Claims, 8 Drawing Sheets

(56) References Cited

U.S. PATENT DOCUMENTS

| | | | |
|---|---|---|---|
| 5,445,280 A | 8/1995 | Rahn | |
| D374,364 S | 10/1996 | Morris | |
| 5,611,442 A | 3/1997 | Howard | |
| 5,626,243 A | 5/1997 | Brozak, Jr. | |
| 5,626,246 A | 5/1997 | Roddy et al. | |
| 5,657,880 A | 8/1997 | Birnbaum | |
| 5,673,801 A | 10/1997 | Markson | |
| D386,347 S | 11/1997 | Rios | |
| 5,690,415 A * | 11/1997 | Krehl | 362/125 |
| 5,746,328 A | 5/1998 | Beeler et al. | |
| 5,758,585 A | 6/1998 | Latchinian | |
| D398,107 S | 9/1998 | Ratcliff | |
| 6,041,720 A | 3/2000 | Hardy | |
| 6,082,557 A | 7/2000 | Leahy | |
| 6,357,606 B1 | 3/2002 | Henry | |
| 6,364,136 B1 | 4/2002 | Weshler et al. | |
| 6,364,273 B1 * | 4/2002 | Otema | 248/444.1 |
| 6,409,027 B1 | 6/2002 | Chang et al. | |
| 6,431,721 B2 * | 8/2002 | Shemitz et al. | 362/125 |
| 6,484,891 B2 | 11/2002 | Burke | |
| 6,571,498 B1 | 6/2003 | Cyrluk | |
| 6,827,465 B2 | 12/2004 | Shemitz et al. | |
| 6,883,671 B2 | 4/2005 | Rushing | |
| D528,840 S | 9/2006 | Greiner | |
| 7,131,543 B2 | 11/2006 | Mason | |
| 7,163,305 B2 | 1/2007 | Bienick | |
| 7,308,987 B2 | 12/2007 | Richardson et al. | |
| 7,434,951 B2 * | 10/2008 | Bienick | 362/92 |
| 7,574,822 B1 | 8/2009 | Moore | |
| 7,591,382 B2 | 9/2009 | Brock | |
| 7,628,525 B2 | 12/2009 | Lee et al. | |
| 7,824,055 B2 | 11/2010 | Sherman | |
| 7,882,969 B2 | 2/2011 | Gerstner et al. | |
| 7,909,183 B2 | 3/2011 | Oh | |
| 7,913,861 B2 | 3/2011 | Mueller et al. | |
| 7,992,728 B2 | 8/2011 | Burgess et al. | |
| 8,087,522 B2 | 1/2012 | Stafford et al. | |
| D656,050 S | 3/2012 | Botelho | |
| 8,215,795 B2 | 7/2012 | Pichel | |
| 8,443,988 B2 | 5/2013 | Niederhuefner | |
| 8,646,935 B2 | 2/2014 | Karan | |
| D704,957 S | 5/2014 | Dimitrakos | |
| 8,763,819 B2 | 7/2014 | Theisen et al. | |
| 2001/0010302 A1 | 8/2001 | Nickerson | |
| 2004/0118795 A1 | 6/2004 | Burke | |
| 2004/0226203 A1 | 11/2004 | Yenglin et al. | |
| 2006/0048419 A1 | 3/2006 | Yenglin et al. | |
| 2006/0049122 A1 | 3/2006 | Mueller et al. | |
| 2007/0068885 A1 | 3/2007 | Busto et al. | |
| 2007/0108142 A1 | 5/2007 | Medcalf et al. | |
| 2007/0138114 A1 | 6/2007 | Dumontet | |
| 2007/0272634 A1 | 11/2007 | Richter et al. | |
| 2008/0121146 A1 | 5/2008 | Burns et al. | |
| 2010/0258513 A1 | 10/2010 | Meyer et al. | |
| 2011/0100941 A1 | 5/2011 | Luberto et al. | |
| 2011/0100942 A1 | 5/2011 | Spizman et al. | |
| 2011/0174750 A1 | 7/2011 | Poulokefalos | |
| 2011/0204009 A1 * | 8/2011 | Karan | 211/59.2 |
| 2011/0315645 A1 | 12/2011 | Fadrowski | |
| 2012/0012547 A1 | 1/2012 | Bergdoll et al. | |

OTHER PUBLICATIONS

Office Action dated Sep. 9, 2013, issued in Canadian Patent Application No. 2,811,284, 3 pages.

Office Action from Canadian Patent Application No. 150,458, mailed Jun. 17, 2014 (1 page).

Office Action from Canadian Patent Application No. 156,840, mailed Jun. 11, 2014 (1 page).

* cited by examiner

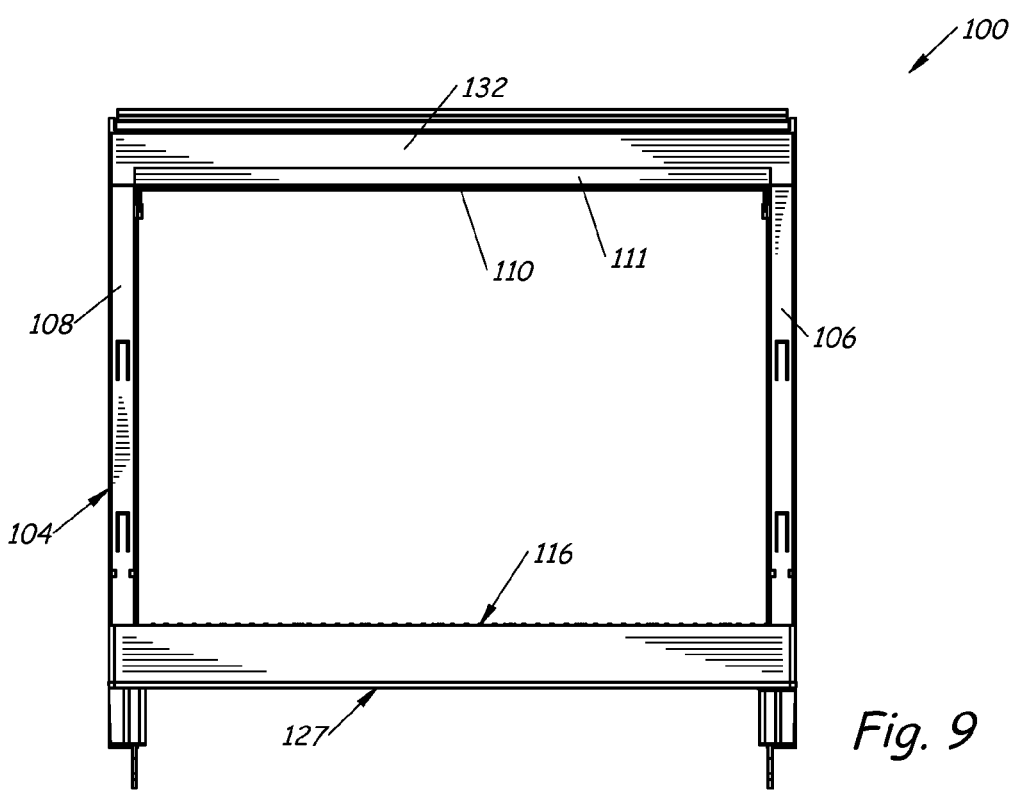
Fig. 9
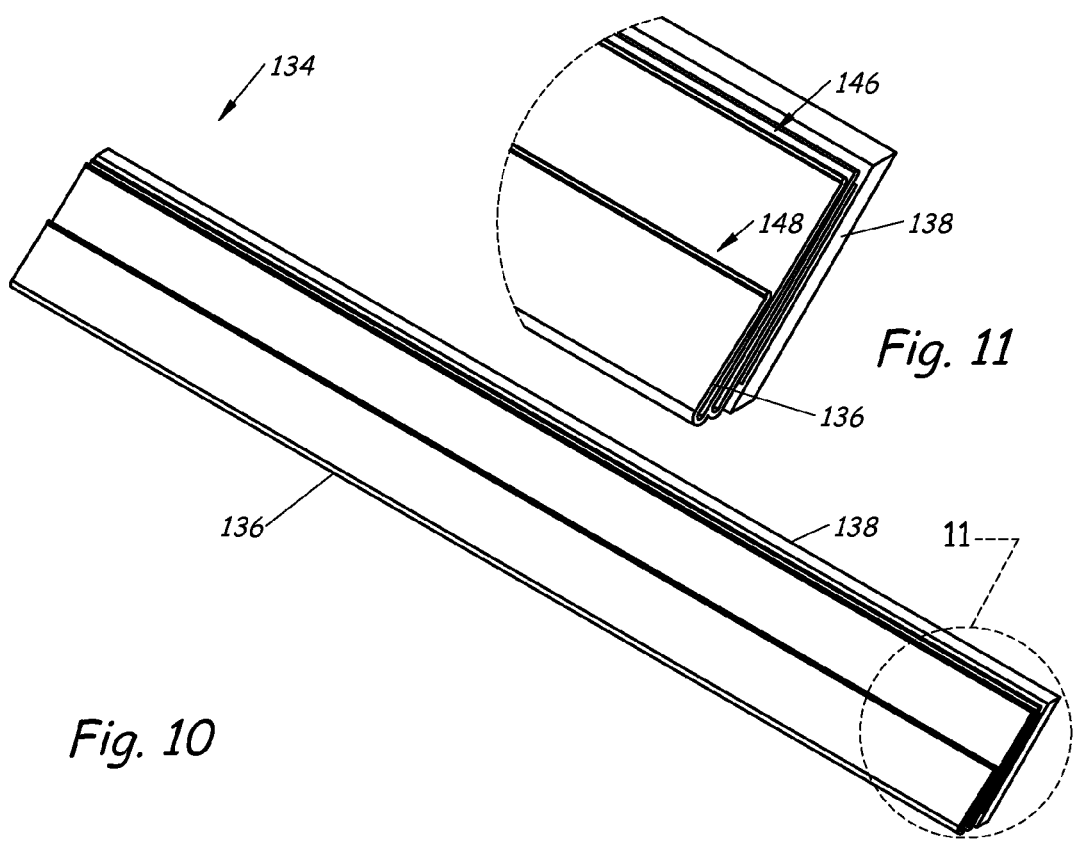
Fig. 10
Fig. 11

HOOK-TYPE DISPLAY MODULE

BACKGROUND

Retail stores use a variety of display fixtures to present products to customers for purchase. These display fixtures can support the product, indicate the product price and include signage, graphics and lighting for highlighting the product. Exemplary display structures include shelves, trays, racks, peg hooks and other similar structures.

The discussion above is merely provided for general background information and is not intended to be used as an aid in determining the scope of the claimed subject matter.

SUMMARY

A hook-type display module includes a base assembly, a display hook receiving plate and at least one display hook. The base assembly includes a pair of spaced-apart side frame members having distal ends and proximal ends and a front frame member connecting the distal ends of the side frame members. The display hook receiving plate is positioned so as to extend between the spaced-apart side frame members and is located proximate to the proximal ends of the spaced-apart side frame members. The at least one display hook includes a base coupled to the display hook receiving plate and a hook extending from the base to a distal end. The distal end of the hook terminates at a location between the display hook receiving plate and the front frame member.

In another embodiment, a hook-type display module includes a main body, a hook bar, a pair of brackets and at least one light. The main body includes a pair of spaced-apart side components having proximal ends and distal ends and a front component connecting the distal ends of the pair of spaced-apart side components. The hook bar extends between the spaced-apart side components and is positioned proximate the proximal ends of the side components. The hook bar receives at least one display hook that extends from the hook bar toward the front component. Each of the pair of brackets is mounted to a respective one of the pair of side components. The pair of brackets couple the main body to uprights on a display unit. The at least one light is mounted to a bottom of the front component. The at least one light being powered by electrical current conducted through the pair uprights and the pair of brackets.

A method of assembling a hook-type display module includes mounting at least one display hook to a display hook receiving plate and mounting brackets located on the hook-type display module to uprights on a display unit. The brackets include electrically conductive material and are configured to conduct electrical current from the upright to at least one light located on a bottom of the front frame member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 9 is a bottom view of the hook-type display module illustrated in FIG. 3.

FIG. 10 is a perspective view of the lens mounted to the lens back plate of the hook-type display module illustrated in FIG. 3.

FIG. 11 is an enlarged perspective view of a portion of FIG. 10.

DETAILED DESCRIPTION

The display modules described below are hook-type display structures that when mounted together and/or with other shelf-type display structures on a wall of a gondola display unit form a display fixture. Each display module includes a base assembly, a hook receiving plate or hook bar, at least one hook mounted to the hook bar, at least one light and a label holder. Each display module aids in displaying and hanging retail products, such as hanging beauty supplies, and illuminating retail products on other display modules located below the display module. Exemplary hanging beauty supplies include lipsticks or pencils, lip glosses, eye shadows, rouge, bronzers, eye liner pencils, mascaras, make-up bases and powders, lotions and etc.

Figure 1:
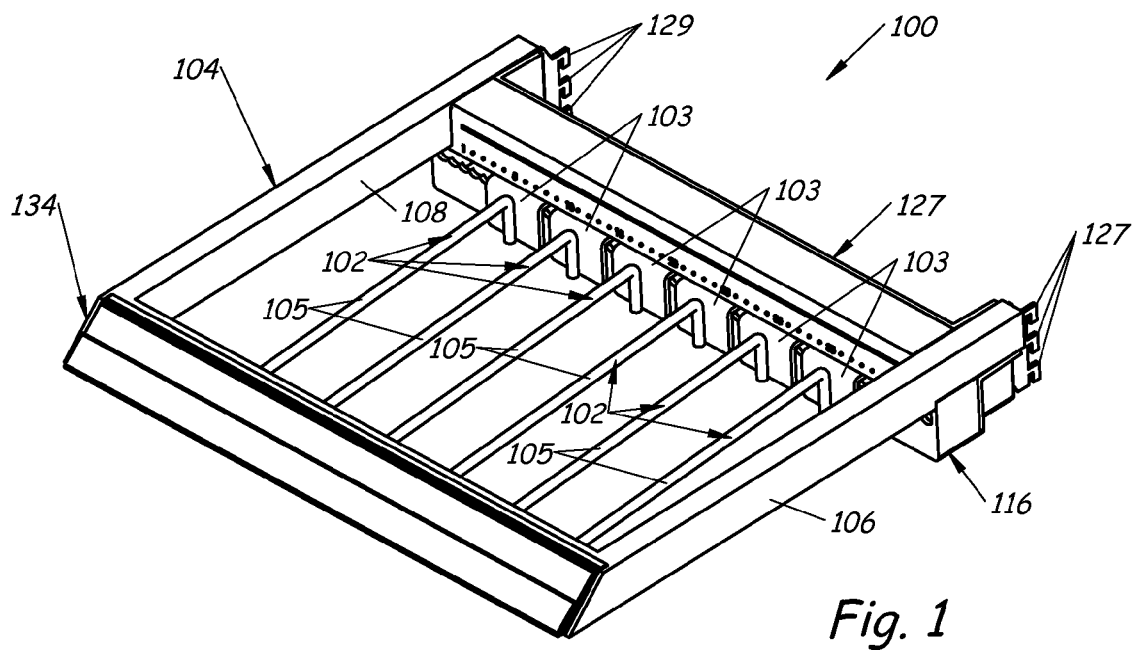
FIG. 1 is a perspective view of a hook-type display module according to one embodiment.
Figure 3:
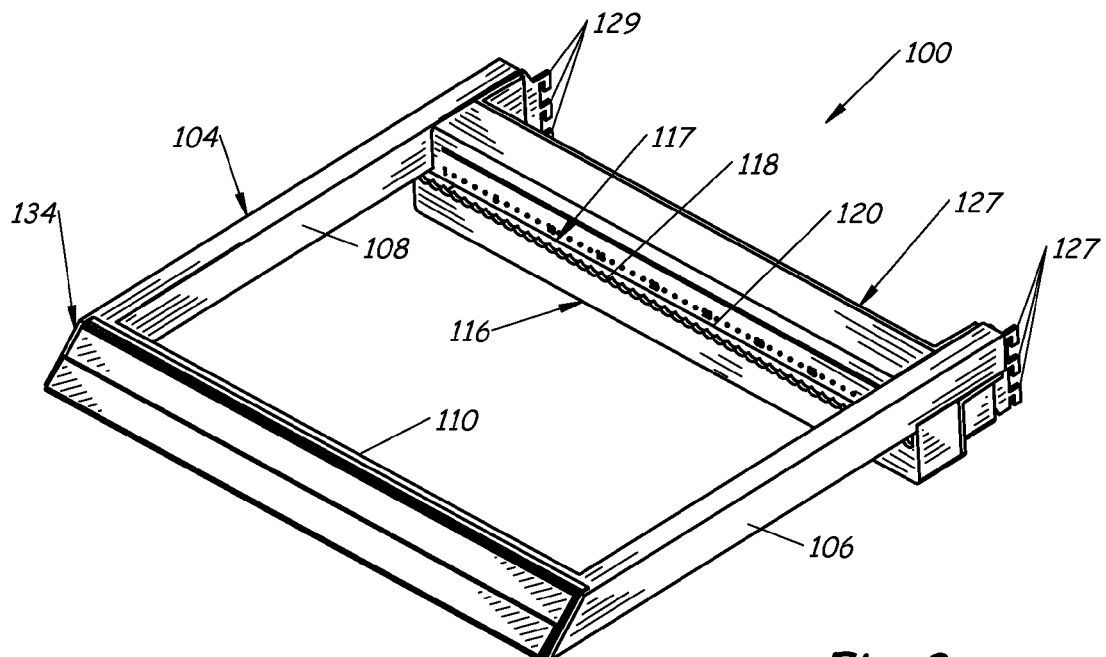
FIG. 3 is a right perspective view of the hook-type display module illustrated in FIG. 1 with hooks removed.
Figure 2:
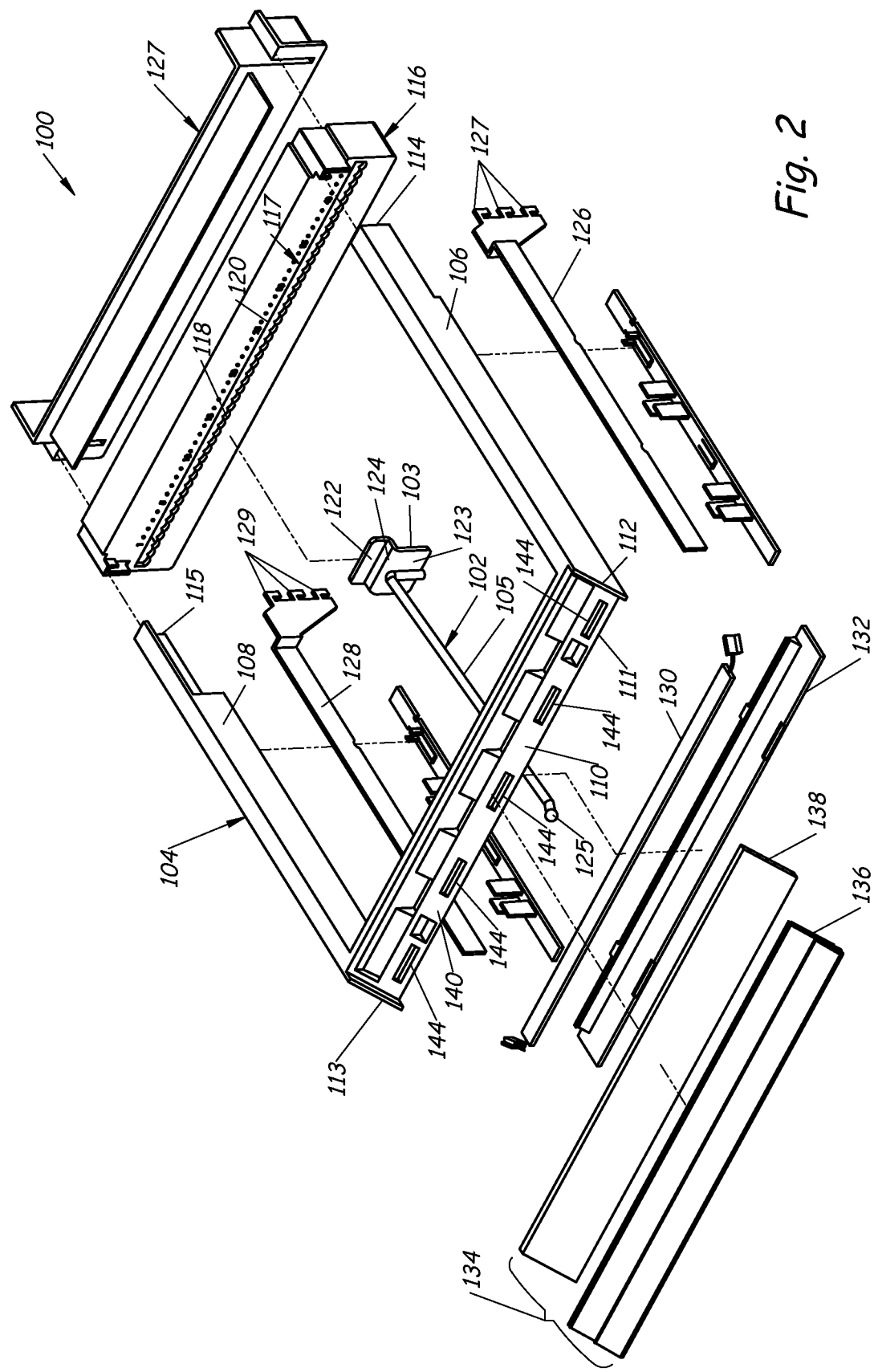
FIG. 2 is an exploded perspective view of the hook-type display module illustrated in FIG. 1.
Figure 4:
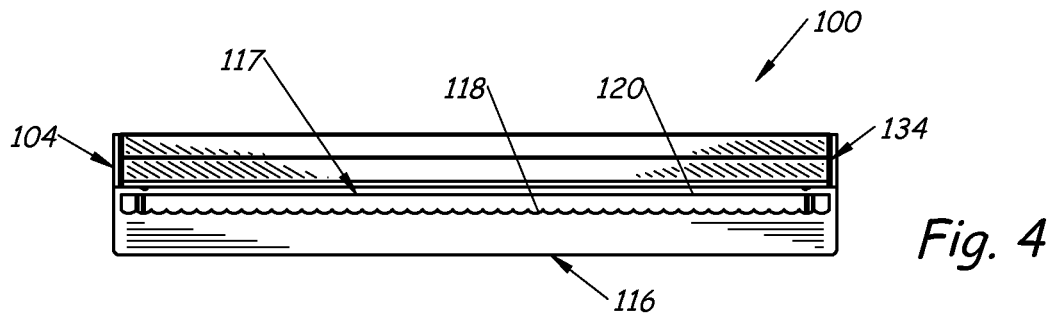
FIG. 4 is a front view of the hook-type display module illustrated in FIG. 3.
Figure 5:
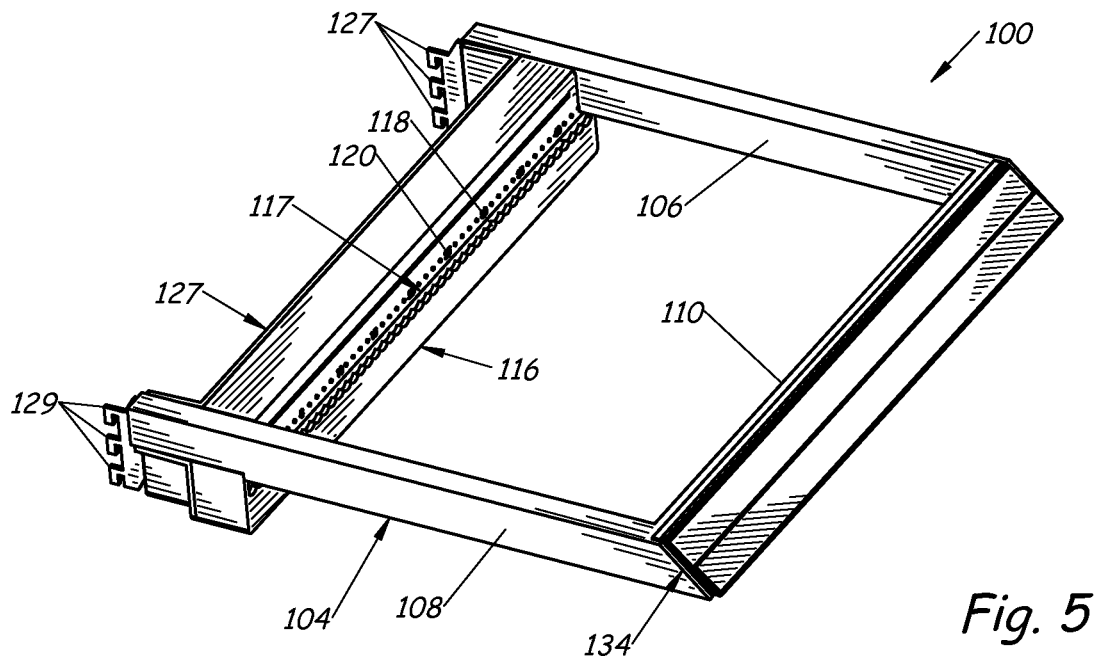
FIG. 5 is a left perspective view of the hook-type display module illustrated in FIG. 3.
Figure 6:
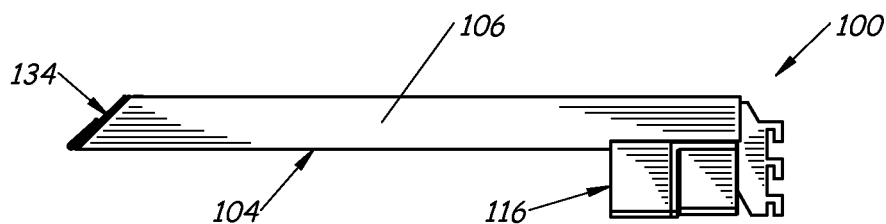
FIG. 6 is a side view of the hook-type display module illustrated in FIG. 3.
Figure 7:
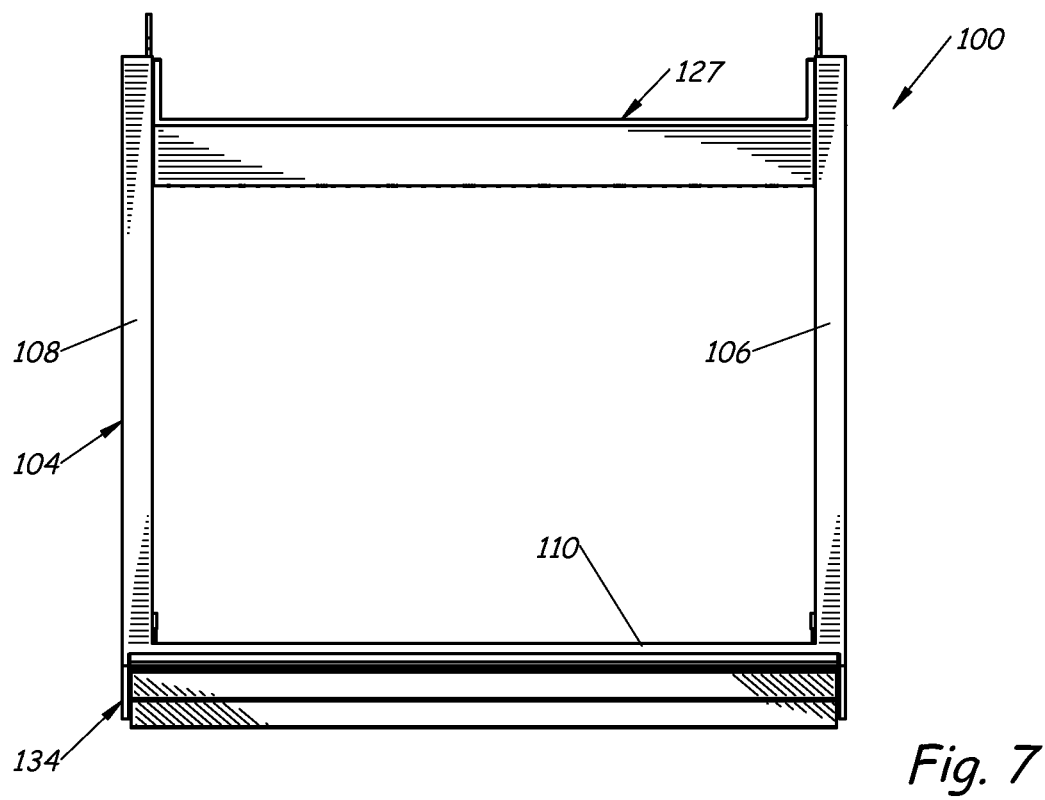
FIG. 7 is a top view of the hook-type display module illustrated in FIG. 3.
Figure 8:
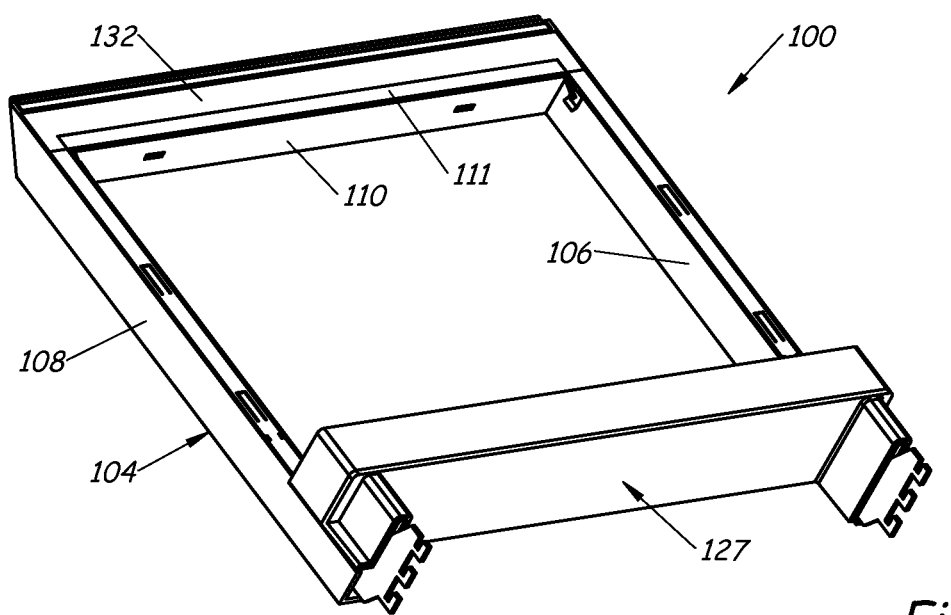
FIG. 8 is a bottom perspective view of the hook-type display module illustrated in FIG. 3.

FIG. 1 is a perspective view of a hook-type display module 100 according to one embodiment. In the FIG. 1 embodiment, hook-type display module 100 includes six display hooks 102. However, any number of display hooks is possible including a single display hook. FIG. 2 is an exploded perspective view of hook-type display module 100 illustrated in FIG. 1 with all but one display hook 102 removed for convenience of illustration. FIG. 3 is a right perspective view of hook-type display module 100 with all display hooks removed. FIGS. 4-9 are additional views of hook-type display module 100 with all display hooks removed including a front view, a left perspective view, a right side view (the left side view being a minor image), a top view, a bottom perspective view and a bottom view.

Hook-type display module 100 includes a base assembly or main body 104. Base assembly or main body 104 can be plastic injection molded using a polymer, such as an opaque styrene. Main body 104 provides a support structure for supporting structural elements including at least one display hook 102 for holding retail products, a pair of brackets 126 and 128 for mounting hook-type display module to a gondola display unit, at least one light 130 for illuminating retail products, a diffuser 132 and a lens assembly 134 for holding printed sheet material.

Main body 104 includes a pair of spaced-apart side frame members or side components 106 and 108 and a front frame member or front component 110. Side frame members 106 and 108 include distal ends 112 and 113 (FIG. 2) and proximal ends 114 and 115 (FIG. 2). Front frame member 110 connects distal end 113 of side frame member 108 to distal end 112 of side frame member 106.

The support for holding at least one display hook 102 includes a display hook receiving plate or hook bar 116 extending between the spaced-apart side frame members 106 and 108 and being positioned proximate to proximal ends 114 and 115 of side frame members 106 and 108. In the embodiment illustrated in FIGS. 1-9, hook bar 116 includes ends that have profiles for engaging with proximal ends 114 and 115 of side frame members 106 and 108. More specifically, proximal ends 114 and 115 of side frame members 106 and 108 fit or slide over the ends of hook bar 116. Mounted to a back of hook bar 116 is a back frame member 127 that provides structural support to hook bar 116 and connects proximal ends 114 and 115 of side frame members 106 and 108 so that back frame member 127, front frame member 110 and side frame members 106 and 108 together define a rectilinear opening for display hooks to extend within.

Hook bar 116 includes an elongated opening 117. A bottom of elongated opening 117 is defined by a scalloped free edge 118 and a top of elongated opening 117 is defined by a straight free edge 120. At least one display hook 102 is mounted to and received by hook bar 116. Display hook 102 includes a base 103 and a hook 105. Base 103 is coupled to hook bar 116 and has an upper flange 122 that extends upward, a lower flange 123 that extends downward and a connecting member 124 that connects upper flange 122 to lower flange 123 and causes upper flange 122 to be out-of-alignment with lower flange 123. Lower flange 123 is connected to hook 105. To mount display hook 102 to hook bar 116, upper flange 122 is inserted through elongated opening 117 so that it extends upward along a back surface of hook bar 116, while features on the bottom of connecting member 124 mate with scalloped free edge 118 so that lower flange 123 extends downward along a front surface of hook bar 116. Hook 105 extends from lower flange 123 of base 103 toward front frame member 110 or to a distal end 125. Distal end 125 terminates at a location between hook bar 116 and front frame member 110. As illustrated in FIGS. 1 and 2, distal end 125 terminates in closer proximity to front frame member 110 than hook bar 116.

Figure 15:
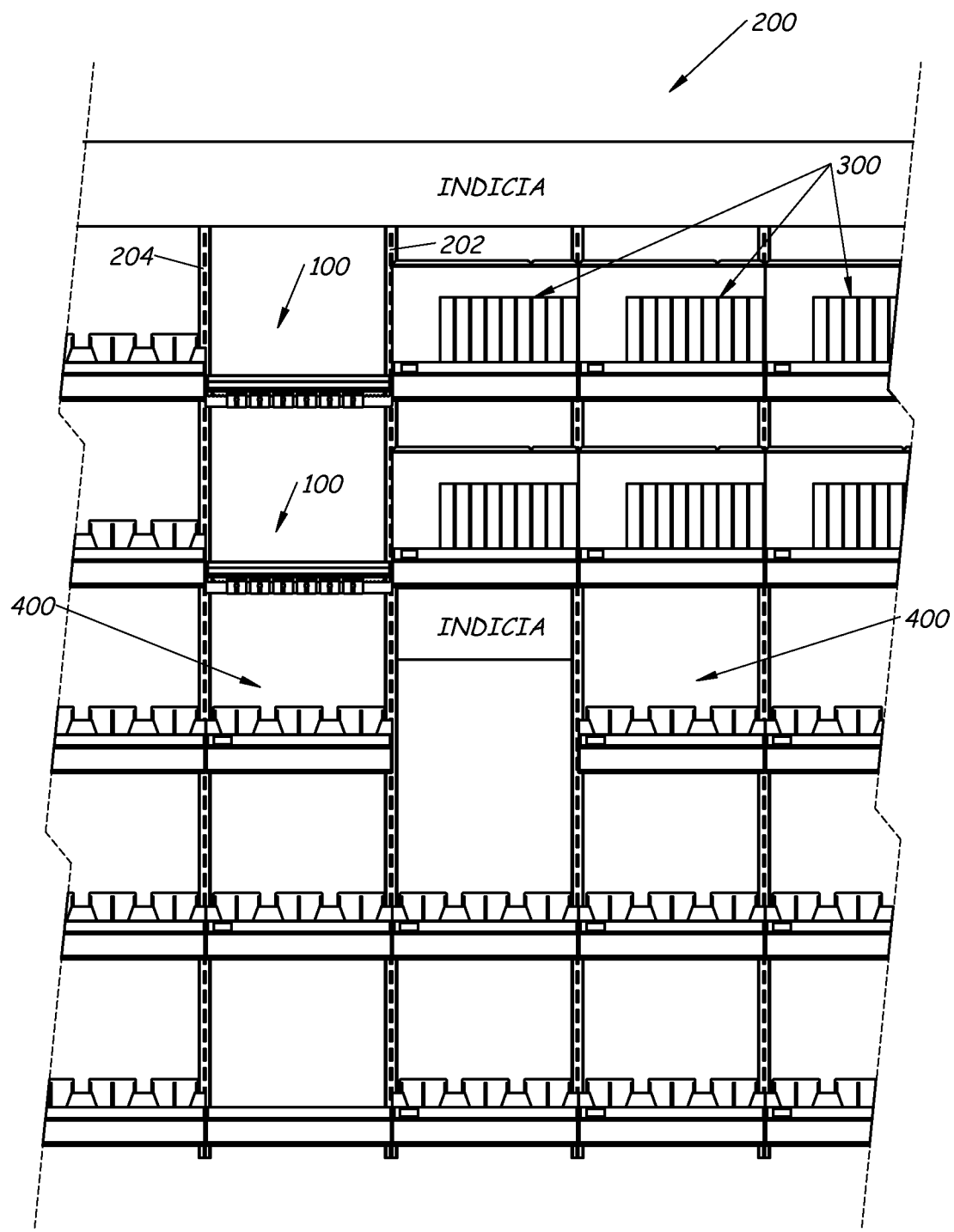
FIG. 15 is a front view of a display fixture including a plurality of shelf-type display modules and hook-type display modules mounted to uprights of a display unit in a retail store.

Brackets 126 and 128 support base assembly or main body 104 on a display unit 200 (FIG. 15). Each bracket 126 and 128 is mounted within a respective one of the pair of side frame members 106 and 108, extends through a portion of hook bar 116, extends through a portion of back frame member 127 and couples base assembly or main body 104 to respective uprights 202 and 204 on a display unit 200 (FIG. 15). As illustrated in FIG. 2, bracket 126 is mounted inside side frame member 106 and bracket 128 is mounted inside side frame member 108.

Hook-type display module 100 includes at least one light 130. As also illustrated in FIG. 2 and in one embodiment, at least one light 130 comprises a plurality of lights or LEDs 130 that are mounted together in a strip. In one embodiment, the pair of brackets 126 and 128 can be made of an electrically conductive material, such as a metal like cold rolled steel, and mounted within base assembly or main body 104 so that a portion of brackets 126 and 128, which have a plurality of fingers 127 and 129 that extend backward from side frame members 106 and 108, are configured to attach to concealed uprights 202 and 204 on a powered back panel that couples to a wall of a gondola display unit. More particularly, fingers 127 and 129 not only mechanically attach hook-type display module 100 to the concealed uprights on the powered back panel, but fingers 107 and 109 also electrically connect with the concealed uprights 202 and 204 on the powered back panel.

Behind fascia panels on the powered back wall panel includes circuitry and wiring for conducting electrical power to uprights 202 and 204. Upon making the appropriate electrical connection, the pair of brackets 126 and 128 complete a circuit designed to power the at least one light 130. In particular and in one embodiment, one end of the strip of LEDs 130 is electrically connected to bracket 126 and the other end of the strip of LEDs 130 is electrically connected to bracket 128 such that current flows between bracket 126 and bracket 128 through LEDs 130 causing them to produce light. Base assembly or main body 104 acts as an insulator and does not conduct electricity between bracket 126 and bracket 128. The at least one light 130 is coupled to a bottom 111 of front frame member 110 and is covered by a diffuser 132, which is also attached to bottom 111 of front frame member 110. In this way, the at least one light 130 not only casts light downward through diffuser 132 to illuminate products being supported by the display hooks and products being supported other hook-type display modules or shelf-type display modules located below, but also casts light upward and through at least a portion of angled front frame member 110 to illuminate lens assembly 134.

Figure 12:
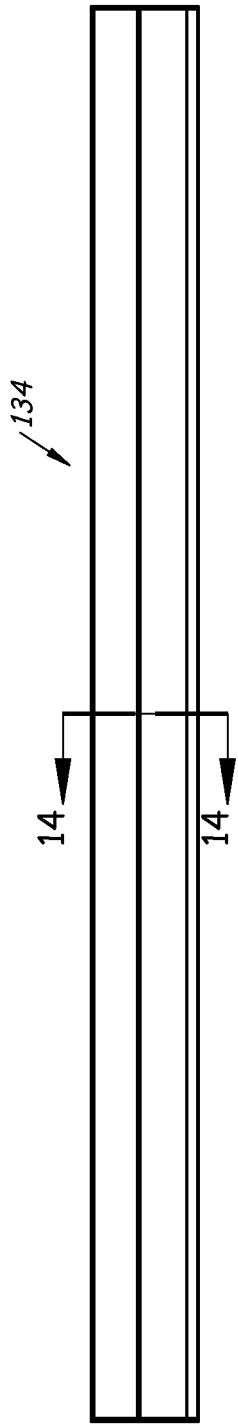
FIG. 12 is a front view of FIG. 10.
Figure 13:
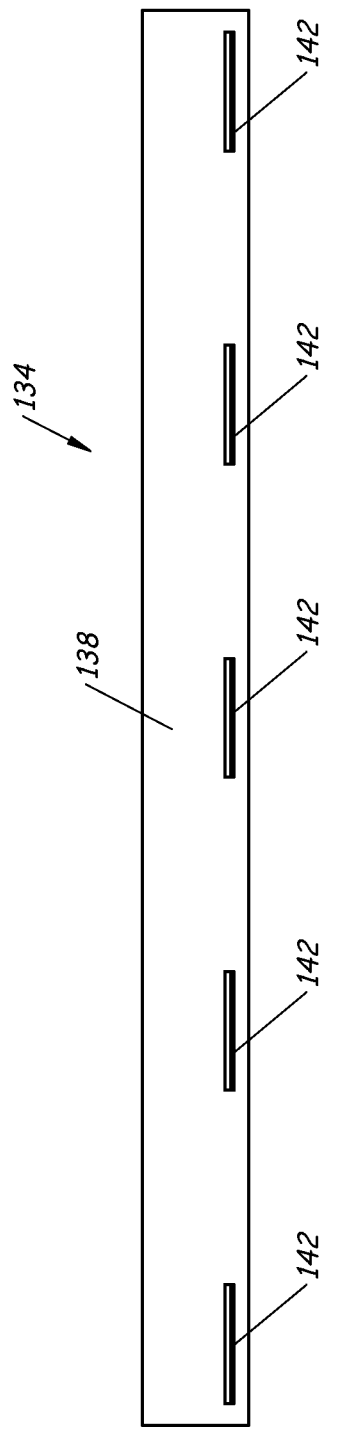
FIG. 13 is a back view of FIG. 10.
Figure 14:
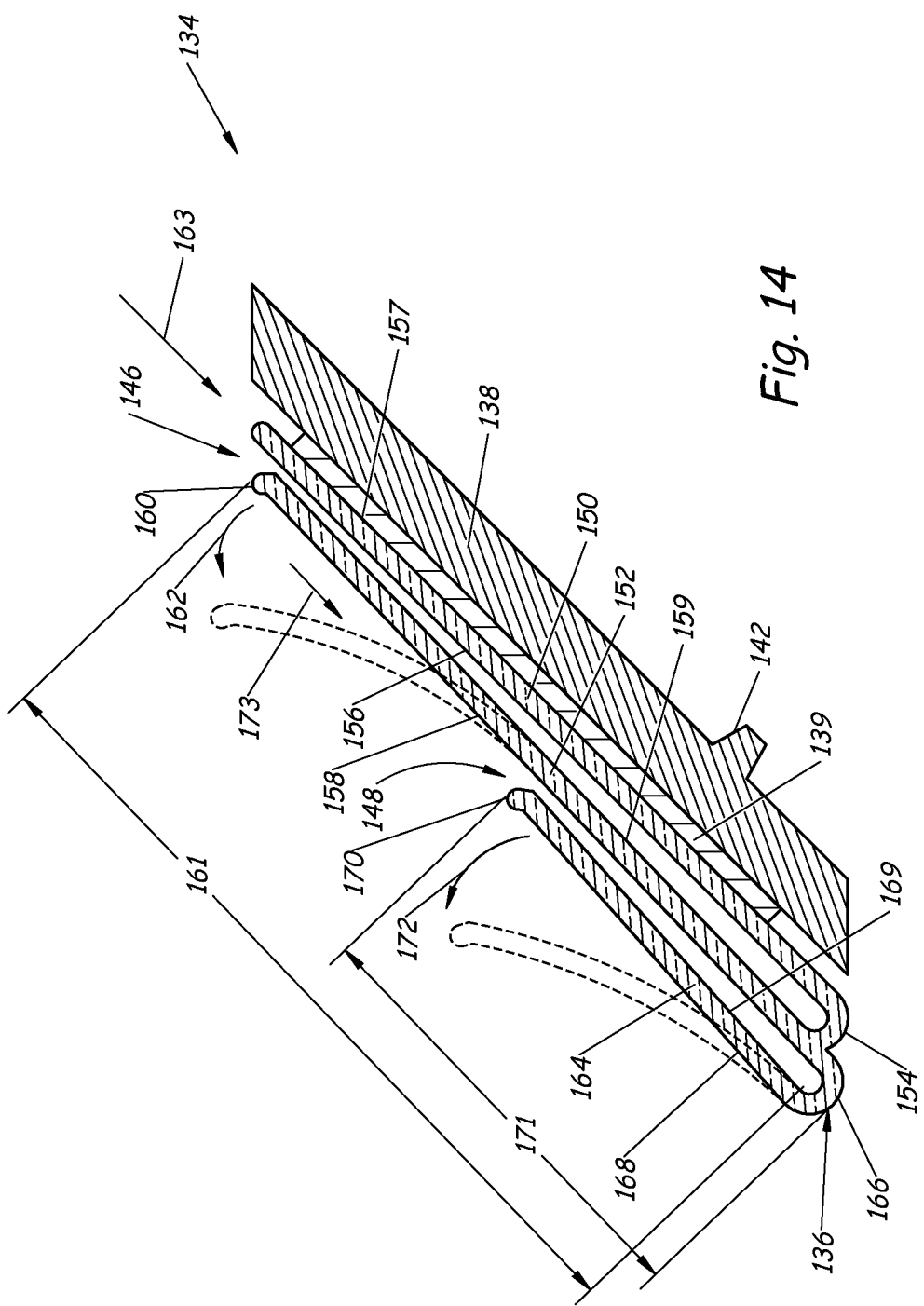
FIG. 14 is an enlarged section view taken through the line indicated in FIG. 10.

Hook-type display module 100 also includes lens assembly 134 mounted to and extending across the entire front surface 140 (FIG. 2) of front frame member 110. As illustrated in FIGS. 2 and 10-14, lens assembly 134 includes a lens or label holder 136 for holding printed sheet material, such as labels, that is substantially the same length as lens back plate or mount plate 138. FIG. 10 is a perspective view of lens or label holder 136 mounted to lens back plate or mount plate 138. FIG. 11 is an enlarged perspective view of a portion of FIG. 10. FIG. 12 is a front view of FIG. 10. FIG. 13 is a back view of FIG. 10. FIG. 14 is an enlarged section view taken through the line indicated in FIG. 10. In one embodiment, label holder 136 is mounted to lens back plate 138 with an adhesive 139 (FIG. 14), such as foam tape.

Lens back plate or mount plate 138 is an angled component that matches the angle of front frame member 110 and is mounted to front surface 140 of front frame member 110. As illustrated in FIGS. 13 and 14, lens back plate 138 includes a plurality of spaced-apart protrusions 142. Protrusions 142 mate with features 144 in front frame member 110 that are recessed from front surface 140 of front frame member 110 so as to securely couple lens back plate 138 to front frame member 110. In one embodiment, lens back plate 138 can be plastic injection molded using a translucent polymer, such as high impact polystyrene (HIPS). Such a translucent material allows a portion of light from at least one light 130 to pass through lens back plate 138 to illuminate sheet material being held in lens or label holder 136.

FIGS. 11 and 14 best illustrate label holder 136. In one embodiment, label holder 136 can be made of a single, continuous and extruded polymer, such as a transparent polyvinyl chloride. However, it is possible for different components of label holder 136 to vary in opacity or transparency. Label holder 136 includes two sign sleeves or channels 146 and 148.

First sign sleeve or channel 146 is defined by a main panel or rigid portion 150 and a return flange or flexible flap 152 that is coupled to main panel 150 at a joined end 154. Main panel 150 is substantially planar as illustrated in FIG. 14 and includes a front surface 156 and a back surface 157 opposite front surface 156. Return flange or flexible flap 152 includes a front surface 158 and a back surface 159 opposite front surface 158. Return flange 152 extends from joined end 154 in a generally up-turned or upward manner and terminates at an end 160 located along main panel 150 at a height 161 relative to a bottom of joined end 154. Height 161 can be substantially the same as the height of main panel 150. In FIG. 14, height 161 is slightly less than the height of main panel 150.

In one embodiment, return flange 152 is substantially flexible and is biased towards main panel 150. More specifically, return flange 152 is biased such that back surface 159 of return flange 152 is biased to interact with or contact a portion of front surface 156 of main panel 150. The flexible nature of return flange 152 allows return flange 152 to be rotated about joined end 154 as indicated by arrow 162. Rotation of return flange 152 allows at least one printed price label or in-store marketing sign or at least a portion of at least one printed price label or in-store marketing sign to be placed between return flange 152 and main panel 150 and into sign sleeve or channel 146 in a top-down manner as indicated by arrow 163. In one embodiment, the printed price label or in-store marketing sign placed in sign sleeve 146 can be a thin gauge sheet material, such as paper, cardstock, paper board, etc., printed with textual and/or graphical indicia including information relating to a number of particular items being displayed on hook-type display module 100. In particular, indicia printed on the price label(s) can indicate product type, department, sale status, supply availability, item price, item name and a bar code or other scannable portion.

Second sign sleeve or channel 148 is defined by return flange or flexible flap 152 and a return flange or flexible flap 164 that is coupled to return flange 152 at a joined end 166. In other words, return flange 152, which defines a front of first sign sleeve 146, also defines a back of second sign sleeve 148. Return flange or flexible flap 164 includes a front surface 168 and a back surface 169 opposite front surface 168. Return flange 164 extends from joined end 166 in a generally up-turned or upward manner and terminates at an end 170 located along return flange 152 at a height 171 relative to a bottom of joined end 166. Height 171 is less than height 161 of return flange 152.

In one embodiment, return flange 164 is substantially flexible and is biased towards return flange 152. More specifically, return flange 164 is biased such that back surface 169 of return flange 164 is biased to interact with or contact a portion of front surface 158 of return flange 152. The flexible nature of return flange 164 allows return flange 164 to be rotated about joined end 166 as indicated by arrow 172. Rotation of return flange 164 allows at least one printed price label or in-store marketing sign or at least a portion of at least one printed price label or in-store marketing sign to be placed between return flange 164 and return flange 152 and into second sign sleeve or channel 148 in a top-down manner as indicated by arrow 173. In one embodiment, the printed price label or in-store marketing sign placed in second sign sleeve 148 can be a thin gauge sheet material, such as paper, cardstock, paper board, etc., printed with textual and/or graphical indicia including information relating to a number of particular items being displayed on hook-type display module 100. In particular, indicia printed on the price label(s) can indicate product type, department, sale status, supply availability, item price, item name and a bar code or other scannable portion.

A label holder that has a double channel configuration as described above and illustrated in FIG. 14 provides label holder 136 the ability to add additional in-store marketing signs or price labels as needed such as when prices of a product change due to a sale or when products need to be highlighted because of a promotion. For example, permanent price labels can be placed in second sign sleeve 148 (which is the front sign sleeve). When there is a sale or reason for a displayed product to be highlighted, an in-store marketing sign can be inserted into first sign sleeve 146. Such an in-store marketing sign can include a base portion for being received by sign sleeve 146 and a free portion that extend out away from first sign sleeve 146 and covers second sign sleeve 148. In this way, a new price can be given to the product being display in hook-type display module 100.

FIG. 18 is a front elevation view of a plurality of display modules all mounted to concealed uprights, such as uprights 202 and 204 on a powered wall panel, which is coupled to a wall of a display unit 200, such as a gondola display unit. Exemplary hook-type display modules including hook-type display modules 100 and exemplary shelf-type display modules including shelf-type display modules 300 and 400 can be mounted to display unit 200. Together lights 130 in each hook-type display module 100 as well as lights in the shelf-type display modules 300 and 400 cast light downward to illuminate the display fixture for both highlighting products for purchase as well as highlighting labels in label holders that are viewable to the customer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A display module comprising:
   a base assembly including a pair of spaced-apart side frame members having distal ends and proximal ends, a front frame member connecting the distal ends of the side frame members;
   a display hook receiving plate positioned so as to extend between the spaced-apart side frame members and located proximate to the proximal ends of the spaced-apart side frame members; and
   at least one display hook mounted to the display hook receiving plate, the at least one display hook including a base coupled to the display hook receiving plate and a hook extending from the base to a distal end, the distal end of the hook terminating at a location between the display hook receiving plate and the front frame member.

2. The display module of claim 1, further comprising at least one light mounted to a bottom of the front frame member.

3. The display module of claim 2, further comprising a diffuser mounted to the bottom of the front frame member and covering the at least one light.

4. The display module of claim 1, further comprising a pair of brackets each mounted to a respective one of the pair of side frame members.

5. The display module of claim 4, wherein one of the pair of brackets is mounted inside the one of the side frame members and the other of the pair of brackets is mounted inside the other of the side frame members.

6. The display module of claim 4, wherein the pair of brackets comprise electrical conductive material and are configured to conduct electrical current through the at least one light.

7. The display module of claim 1, further comprising a lens assembly having a mount plate mounted to a front surface of the front frame member and a label holder mounted to the mount plate.

8. The display module of claim 7, wherein the label holder comprises first and second sign sleeves for holding sheet material having printed indicia, wherein a flexible flap that defines a front of the first sign sleeve defines a back of the second sign sleeve.

9. The display module of claim 1, wherein the base assembly comprises a back frame member that connects the proximal ends of the pair of side frame members, the back frame member is mounted to a back of the display hook receiving plate.

10. The display module of claim 1, wherein the display hook receiving plate comprises an elongated opening and wherein the base of the at least one display hook comprises features that mate with the elongated opening.

11. A display module comprising:
a main body including a pair of spaced-apart side components having proximal ends and distal ends and a front component connecting the distal ends of the pair of spaced-apart side components;
a hook bar extending between the spaced-apart side components and being positioned proximate the proximal ends of the side components, the hook bar receiving at least one display hook that extends from the hook bar toward the front component;
a pair of brackets each mounted to a respective one of the pair of side components, the pair of brackets coupling the main body to uprights on a display unit; and
at least one light mounted to a bottom of the front component, the at least one light being powered by electrical current being conducted through the pair uprights and the pair of brackets.

12. The display module of claim 11, wherein the hook bar comprises an elongated opening defined by a scalloped edge on a bottom and defined by a straight free edge on a top.

13. The display module of claim 12, wherein the at least one display hook includes a base that mates with the elongated opening in the hook bar.

14. The display module of claim 11, further comprising a diffuser mounted to the bottom of the front component of the main body and covering the at least one light.

15. The display module of claim 11, wherein the at least one light comprises a strip of LED lights.

16. The display module of claim 11, further comprising a lens assembly mounted to a front of the front component, the lens assembly having a mount plate that mounts to the front of the front component and a label holder mounted to the mount plate.

17. The display module of claim 16, wherein the label holder comprises two channels for holding sheet material having printed indicia, wherein a first channel of the two channels is located behind a second channel of the two channels.

18. A method of assembling a display module comprising:
mounting at least one display hook to a display hook receiving plate of a base assembly, wherein the base assembly comprises a pair of spaced-apart side frame members having distal ends and proximal ends and a front frame member connecting the distal ends of the side frame members and wherein the display hook receiving plate is positioned so as to extend between the spaced-apart side frame members proximate to the proximal ends of the spaced-apart side frame members; and
wherein mounting the at least one display hook to the display hook receiving plate comprises coupling a base of the at least one display hook to the display hook receiving plate to allow a hook of the at least one display hook to extend from the base of the at least one display hook to a distal end, the distal end of the hook terminating at a location between the display hook receiving plate and the front frame member.

19. The method of claim 18, wherein the base assembly further comprises a pair of brackets each mounted to a respective one of the pair of side frame members.

20. The method of claim 19, further comprising mounting the pair of brackets to uprights on a display unit, wherein the pair of brackets comprise electrically conductive material and are configured to conduct electrical current through the uprights to at least one light located on a bottom of the front frame member.

* * * * *